Patented Feb. 21, 1933

1,898,076

UNITED STATES PATENT OFFICE

GEORGE BARNHART, OF SALEM, NEW JERSEY, ASSIGNOR TO E. I. DU PONT DE NEMOURS & COMPANY, OF WILMINGTON, DELAWARE, A CORPORATION OF DELAWARE

SULPHUR BLACK AND PREPARATION OF THE SAME

No Drawing. Application filed October 25, 1926. Serial No. 144,177.

This invention relates to the manufacture of sulphur black. More particularly it is concerned with an improvement in the well-known process of manufacturing a black dye from nitrophenol intermediates by fusing the latter with polysulphides, precipitating the black and drying it, which improvement comprises the acidification of the black before drying.

To those skilled in the art it is a well-known fact that sulphur black as ordinarily prepared shows a decided tendency to further oxidation upon drying and grinding. This results not only in a change of shade, but in a loss in strength and solubility. Furthermore, the product after drying and grinding has a tendency to heat up upon storage.

The object of the improved process which, with the resulting product, constitutes the present invention is to overcome these objectionable features and produce a product which retains the shade of the press cake, which is practically as soluble as the material of the press cake and which does not tend to appreciably heat during storage.

In general, in carrying the improved process into effect, a measured quantity of the intermediate, which may be sodium dinitrophenolate, is charged gradually into a hot solution of a known quantity of sodium polysulphide. The admixture is accompanied by evolution of heat. After the intermediate has all been added, external heat is applied until the reaction is completed. The color is then isolated, preferably by diluting the fusion mass with water and blowing thereinto a current of air until the precipitation is complete. The mixture is filtered and the residue washed thoroughly to remove all water soluble impurities. The resulting filter cake is then acidified until it shows a distinctly acid reaction. Upon drying this acid press cake the finished product is obtained.

In acidifying the washed filter cake acid should be added in sufficient quantity to produce a distinctly acid reaction to litmus, which corresponds to a hydrogen ion concentration of at least $10^{-6}$. In most cases it is preferable to acidify until a distinctly acid reaction is shown to Congo red, which corresponds to a hydrogen ion concentration of approximately $10^{-3}$.

In order that the improved process may be disclosed in detail an example of a preferred embodiment thereof is furnished below. It is to be understood that this example is purely illustrative and that I am in no way limited thereby to the particular procedure, conditions or reagents therein specified.

Example

One part of sodium dinitrophenolate is introduced into a hot 40 per cent solution of sodium tetrasulphide containing 1.5 parts of tetrasulphide at such a rate that vigorous ebullition is produced. When the addition is complete the mass is evaporated until a temperature of 112–116° C. is obtained and maintained at this temperature until a test shows that no uncombined intermediate is present. The mass is then diluted with several parts of water and precipitated by oxidation with air. When precipitation is complete the residue is filtered off and thoroughly washed. The press cake is then suspended in water, acidified to Congo red paper with about 0.05 to 0.07 parts of concentrated sulfuric acid or the corresponding amount of hydrochloric acid. The mass is then filtered and the press cake dried.

Although I have mentioned sodium dinitrophenolate particularly, there are many other compounds which might be employed without departing from the spirit of my invention. For example, 2:4-dinitro-4'-hydroxy-diphenylamine, or the mononitrophenols, dinitrophenols, trinitrophenols and their derivatives which upon fusion with polysulphides give sulphur black, are adapted for such use.

The particular procedure followed in carrying out the invention is also obviously susceptible of considerable variation. For example, the sulphur black need not be isolated from the diluted fusion mass by blowing with air, but may be isolated by the addition of acid directly to the mass in such quantity as to show a distinctly acid reaction to Congo red. The resulting precipitate is consequently recovered in acid condition. This procedure, although the resulting black is superior to the ordinary black in stability, is not the equivalent of that illustrated in the foregoing example, since the black is likely to be contaminated with free sulphur.

Another variation, equally obvious, is to effect acidification of the suspension resulting from blowing the diluted mass with air prior to filtration.

By this process a stable sulphur black is obtained which does not appreciably change in shade, strength or solubility upon storage. Moreover, this product shows no substantial tendency to heat up upon storage.

I claim:

1. In the process of manufacturing dry sulphur black which involves thionation of a nitrophenol intermediate, precipitation of the black in a non-acid medium and drying the precipitate, the step of acidifying the precipitated black before drying to show in aqueous suspension a hydrogen ion concentration of at least $10^{-6}$.

2. In the process of manufacturing sulphur black which comprises effecting the thionation of a nitrophenol intermediate, and precipitating the black in a non-acid medium, the step of rendering the precipitate acid to litmus before drying.

3. In the process of manufacturing dry sulphur black from a nitrophenol compound which is adapted to yield a product from which sulphur black may be obtained by oxidation, which process comprises effecting the thionation of said compound, and oxidizing the product of the thionation to obtain a crude sulphur black, the step of acidifying the black to show at least an acid reaction to litmus before drying.

4. In the process of manufacturing dry sulphur black from a nitrophenol compound which is adapted to yield a product from which sulphur black may be obtained by oxidation, which process comprises effecting the thionation of said compound, oxidizing the product of the thionation to obtain a crude sulphur black, and filtering, the step of rendering the filter cake at least acid to litmus before drying.

5. In the process of manufacturing dry sulphur black from a nitrophenol compound which is adapted to yield a product from which sulphur black may be obtained by oxidation, which process comprises effecting the thionation of said compound, diluting the resulting mass with water and passing air through the resulting solution to precipitate the crude black, the step of rendering the precipitate acid to litmus before drying.

6. In the process of manufacturing sulphur black from a nitrophenol compound which is adapted to yield a product from which sulphur black may be obtained by oxidation, which process comprises effecting the thionation of said compound, diluting the resulting mass with water, and passing air through the resulting solution to precipitate the crude black, the step of adding sufficient acid to said black to render it at least acid to litmus.

7. An improved sulphur black having the properties of a black made from a dinitrophenol intermediate by thionating the same, precipitating the crude product, rendering the precipitate at least acid to litmus and drying.

8. An improved sulphur black having the properties of a black made from a dinitrophenol intermediate by thionating the same, precipitating the crude product, filtering to obtain a filter cake, rendering said cake at least acid to litmus and drying.

9. An improved sulphur black having the properties of a black made from a dinitrophenol intermediate by heating the same with sodium polysulphide to obtain a fused mass, diluting said mass with water, precipitating the crude black with air, filtering, suspending the filter cake in water, rendering the suspension acid to Congo red paper, filtering and drying.

10. In the process of manufacturing dry sulphur black which involves thionation of a nitrophenol intermediate, precipitation of the black by aeration, filtering off the precipitate and drying, the step of adding acid to the filter cake until at least acid to litmus prior to drying.

11. In the process of manufacturing dry sulphur black from a nitrophenol compound which is adapted to yield a product from which sulphur black may be obtained by oxidation, which process comprises effecting the thionation of said compound, diluting the resulting mass with water, passing air through the resulting solution to precipitate the crude black and filtering, the step of treating the filter cake with acid until at least acid to litmus before drying.

12. In the preparation of a very soluble stable sulphur black the step of acidifying the separated sulphur black before drying to the extent that an aqueous suspension shows a hydrogen ion concentration greater than $10^{-6}$.

13. The process of producing sulphur black comprising thionating a nitro-phenol compound, adding an acidifying substance until at least acid to litmus, separating and drying the resultant sulphur black.

14. The process of producing sulphur black comprising thionating a nitro-phenol compound, precipitating the corresponding sulphur black, rendering the precipitated black at least acid to litmus, separating and drying the resultant sulphur black.

15. The process of producing sulphur black comprising thionating a nitro-phenol compound, precipitating the corresponding sulphur black by aeration, rendering the precipitated black at least acid to litmus, separating and drying the resultant sulphur black.

16. The process of producing sulphur black comprising thionating a nitro-phenol compound, precipitating the corresponding sulphur black by acid, rendering the precipitated black at least acid to litmus, separating and drying the resultant sulphur black.

In testimony whereof I affix my signature.

GEORGE BARNHART.